United States Patent [19]

Dowdall

[11] Patent Number: 4,958,659
[45] Date of Patent: Sep. 25, 1990

[54] PRESSURING AND PURGING APPARATUS
[75] Inventor: Dennis S. Dowdall, Morden, England
[73] Assignee: Telektron Limited, Surrey, England
[21] Appl. No.: 422,422
[22] Filed: Oct. 17, 1989
[30] Foreign Application Priority Data
  Oct. 17, 1988 [GB] United Kingdom ............... 8824276
[51] Int. Cl.⁵ ............................................. B65D 25/00
[52] U.S. Cl. .......................... 137/624.12; 137/624.18;
                                            137/495; 220/88 B
[58] Field of Search ...................... 137/624.11, 624.18,
                              137/624.2, 624.12, 495; 220/88 B

[56] References Cited
U.S. PATENT DOCUMENTS
3,777,928 12/1973 Kober ................................ 220/88 B
4,169,225 9/1979 Rickert ......................... 220/88 B X
4,802,502 2/1989 Williams .......................... 137/554 X Primary Examiner—Alan Cohan
Attorney, Agent, or Firm—Watson, Cole, Grindle & Watson

[57] ABSTRACT

An apparatus for pressurizing and purging the interior of an enclosure (1) comprises a purge valve (3) operable to admit gas to the enclosure either at a high flow rate or at a low flow rate, and a pneumatic control system for the purge valve including a purge/power selector module (6), a enclosure pressure module (4) and a timing module (5) mounted on respective faces of the purge valve body. The purge valve body serves as a manifold providing necessary connections of the control modules (4–6) with each other and the enclosure interior whereby pipe connections are minimised.

21 Claims, 4 Drawing Sheets

PRESSURING AND PURGING APPARATUS

This invention is concerned with apparatus for pressurising and purging with gas, especially but not necessarily exclusively air, an enclosure for equipment which requires protection, such as electrical equipment installed in areas where there is a risk of an explosive atmosphere being ignited by an electric spark, or equipment which requires a stream of gas to be passed over it for cooling purposes and/or to dilute potentially hazardous gases or vapours which may be released from the equipment during use.

The apparatus of the invention is specifically described herein with respect to an embodiment adapted to protect electrical equipment and to provide automatic control of the connection of the equipment to an electric power supply.

The concept of pressurising and purging an equipment enclosure is well known. Air (or other inert gas if desired) is passed through the enclosure at a relatively high flow rate and for sufficient time to purge the interior of the enclosure of any hazardous gases which may have accumulated in the enclosure during a period of non-use of the enclosed equipment. After purging the flow rate is substantially reduced but a small gas flow is maintained to keep the interior of the enclosure at a pressure slightly above that of the ambient atmosphere. Electrical power can then be connected safely to the protected equipment.

The present invention resides in a pneumatically operated pressurising and purging apparatus which provides for automatic control of the pressurisation and purging routine in response to the delivery to the apparatus of a gas under pressure More particularly, the apparatus of the invention is of a novel construction wherein pipework and pipe joints between control components are kept to a minimum, whereby reliability is improved, and most of the control parts are incorporated in a common integrated assembly of neat and compact form. A main module of the assembly includes a purge valve which controls the flow of gas into the enclosure for purging. This module can act as a manifold and incorporate ducts providing all the necessary pneumatic connections with the interior of the enclosure, the module being mounted on the outside of an enclosure wall equipped with the necessary ports A number of further modules are mounted on the main module and have their necessary pneumatic connections with the main module formed directly between them without intervening pipes or the like. One module may incorporate high and low pressure sensing devices for ensuring that the pressure in the enclosure is within predetermined upper and lower limits. Another module may incorporate pneumatic devices of a timing module provided to control the time for which the purging flow is allowed to continue, the module producing a pneumatic output signal when the preset purging time has elapsed A further module can incorporate valves and other pneumatic control circuit elements for controlling the purge valve and responding to the output signal from the timing module to close the purge valve and possibly to operate switches which control the supply of electric power to the protected equipment.

A better understanding of the apparatus of the invention will be had from the detailed description which follows, reference being made to the accompanying drawings in which.

Figure 1A:
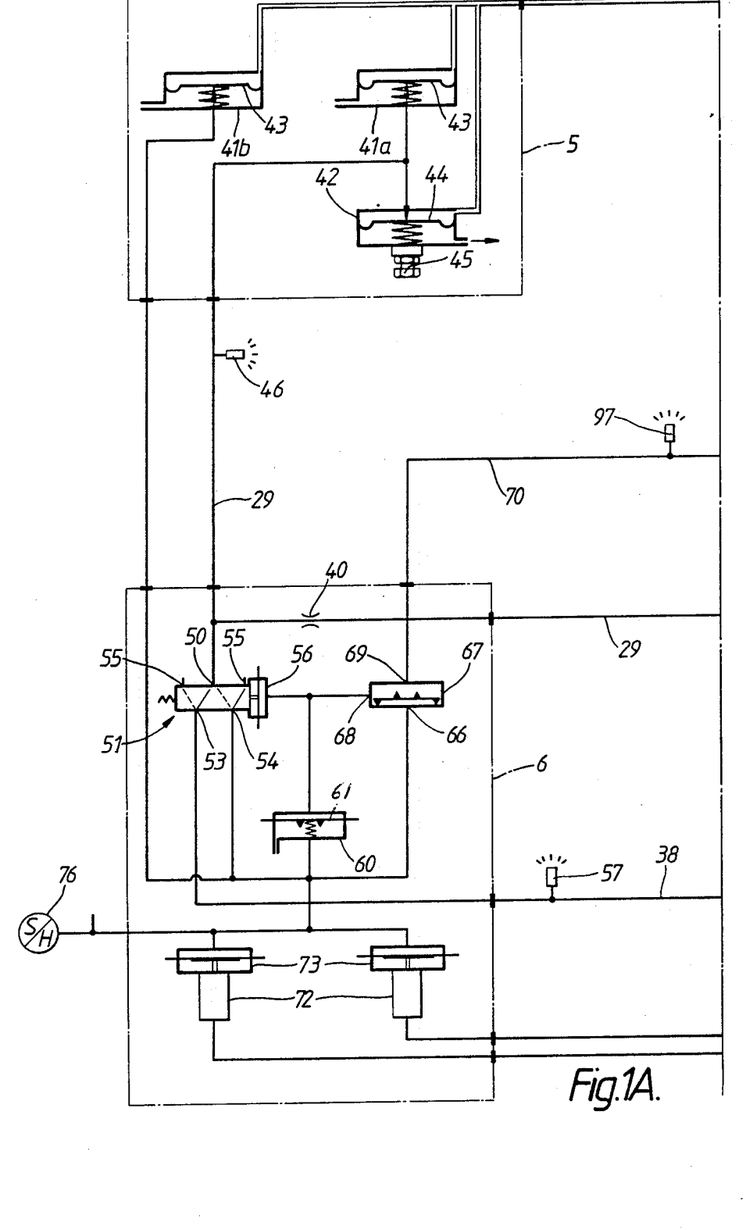
FIG. 1 is a schematic diagram of an apparatus embodying the invention.
Figure 1B:
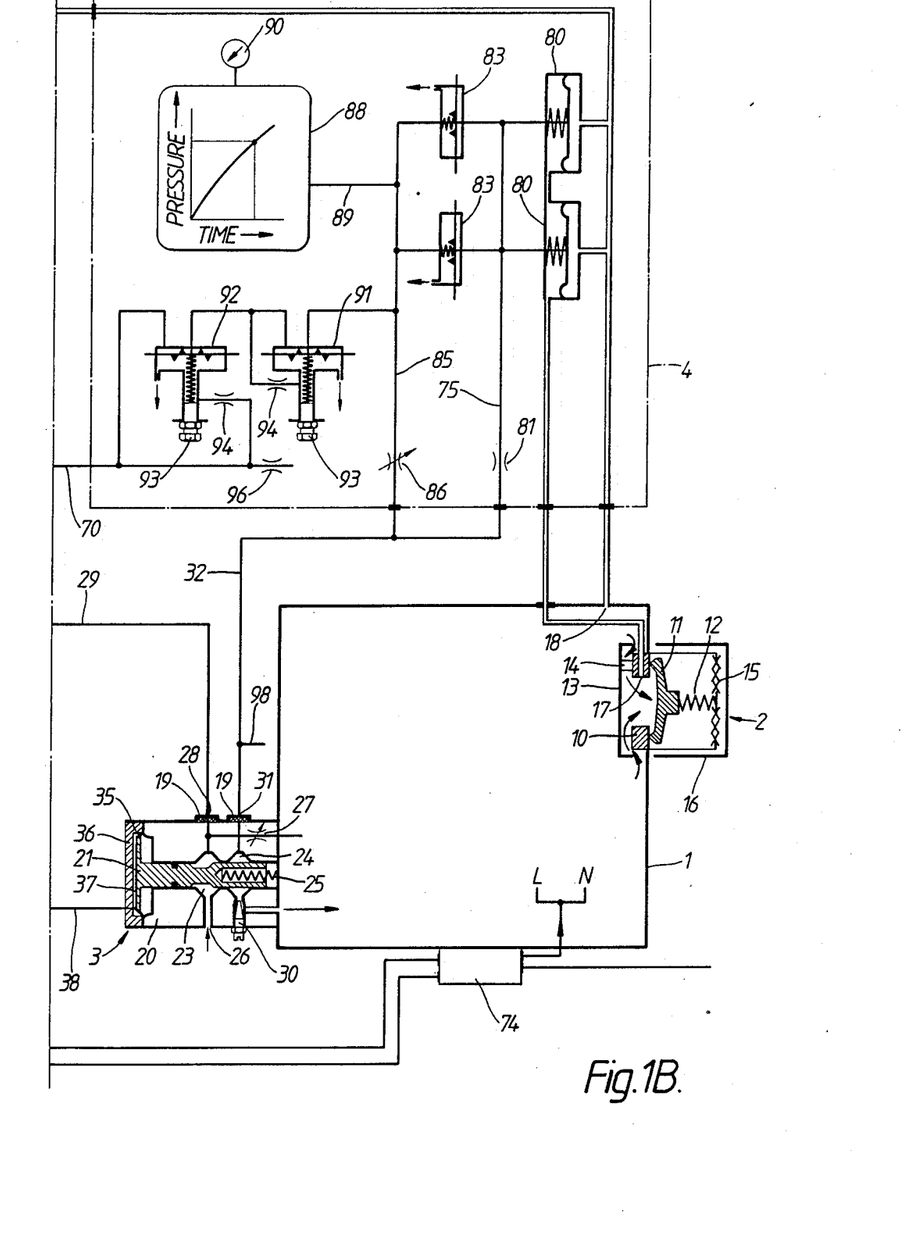
Figure 2:
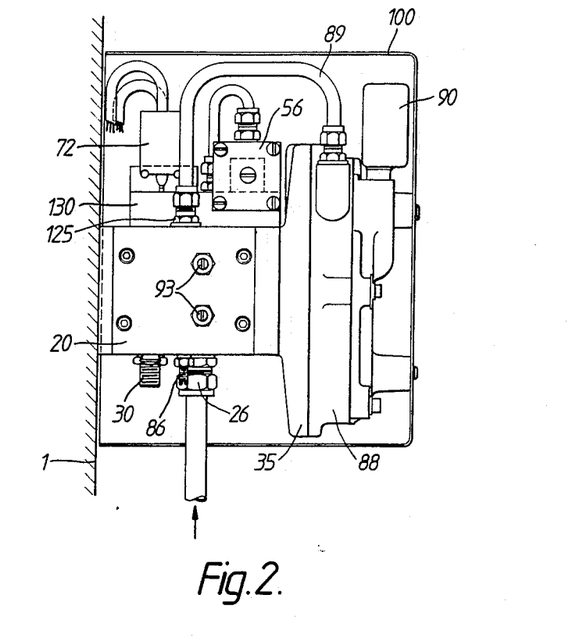
FIG. 2 is a side view of the control assembly of the apparatus.

The apparatus of the invention will first be explained with reference to the schematic diagram of FIG. 1. The apparatus consists of three basic units, namely the enclosure 1 which houses the electrical equipment to be protected, an exit module 2 through which gas, which will be assumed to be air for the purpose of this description, escapes from the enclosure to the ambient atmosphere, and a control assembly which controls the supply of air and electric power and which incorporates a purge supply module 3, a timing module 4, an enclosure pressure module 5 and a purge/power selector module 6.

The enclosure 1 defines a closed housing which typically has an inspection door to enable access to the enclosed equipment, such as for repair or maintenance.

The exit module includes a valve seat 10 surrounding an opening in the housing, and a valve member 11 biased against the seat by a spring 12 to provide a low pressure relief valve. A baffle plate 13 covers the valve seat within the enclosure and defines with the seat a constricted radial orifice through which air leaving the enclosure is constrained to pass. Spacers 14 between the baffle plate and the valve seat determine the orifice size for obtaining a given pressure difference between the upstream and downstream sides of the radial orifice when a particular air flow rate through the orifice exists, for reasons which will become clear.

There is a first pressure sensing port 17 provided in the valve seat 10, and a second pressure sensing port 18 which opens into the enclosure on the upstream side of the radial orifice. These ports are connected to differential pressure sensors included in the timing module 4 of the control assembly, as described in more detail below.

The exit module also includes a spark arrestor 15 through which the exiting air passes, and an external cover 16 for protection against water splashes and the like.

The purge supply module 3 of the control assembly is firmly mounted on the enclosure by bolts. It comprises a body 20 with a bore in which is received a slidable purge flow valve spool 21. The bore includes two enlargements defining a pair of valve chambers 23, 24 separated by a land. The spool 21 has a stepped diameter and a shoulder thus formed is biased into sealing engagement with the land by a spring 25 acting on the spool for closing the valve. The first chamber 23 communicates with an air inlet port 26, with the interior of the enclosure via a duct formed in the body 20 and including an adjustable flow restrictor 27, and with an outlet port 28 fitted with a filter 19 and leading to an air supply line 29 of a pneumatic control circuit. When air is delivered to the inlet port 26 there is a continuous flow of air, which may be termed a leakage compensation flow, at a rate regulated by the adjustment of the restrictor 27, into the enclosure, and a continuous flow of air to the control line 29. The valve chamber 24 also communicates with the interior of the enclosure through a duct formed in the body, an adjustable purge flow regulator 30 being provided in the flow path for adjusting the flow rate of air entering the enclosure from valve chamber 24. Chamber 24 communicates also with an exit port 31 fitted with a filter 19 and connected to a control line 32 which leads to the timing module 4. When the purge valve is opened by the spool 21 being displaced to the right, as seen in FIG. 1, against the action of the spring 25, the chamber 24 is brought into free communication with the chamber 23, and a substantially increased flow of air enters the enclosure 1 for purging the interior of the enclosure. The purge flow regulator provides a small restriction and is included only to ensure that the full air inlet pressure will be delivered to the exit port 31 for control purposes. For driving the spool 21 to open the purge valve a pneumatic actuator 35 is provided, this actuator having a diaphragm clamped between the body 20 and a rear end cover 36 of the module. The chamber 37 thus formed between the diaphragm and the cover, i.e. on the side of the diaphragm remote from the spool, has a control port which is connected to an air way 38 leading from the purge/power module 6. The actuator diaphragm acts on the rear end of spool 21 through a plate attached to the spool, whereby supply of air to chamber 37 via the air way 38 will cause the spool to be driven against the force of spring 25 to open the purge valve.

The air control supply line 29 includes a flow restrictor 40 for producing a reduced control air flow which is supplied to the nozzle of one of two low pressure sensing diaphragm valves 41a, 41b, and one high pressure sensing diaphragm valve 42 of the enclosure pressure module 5. In each of valves 41a, 41b, the diaphragm 43 is urged away from the nozzle by a light spring, the space on the side of the diaphragm remote from the nozzle is connected to the interior of enclosure 1, and the space on the other side of the diaphragm is open to atmosphere. Thus, only when the air pressure in the enclosure reaches a given level, which is the predetermined minimum operating pressure, will the diaphragm overcome the spring to close the nozzle of valve 41a and hence allow pressure to build up in the line 29 downstream of the restrictor 40. The valve 42 has its diaphragm 44 urged against the nozzle by a light spring, and the space on the side of the diaphragm 44 remote from the nozzle is connected to atmosphere while the space on the other side of the diaphragm is connected to the inside of the enclosure 1. The prestress in the spring is adjustable by means of a screw 45 and determines that pressure level in the enclosure at which valve 42 will open and allow pressure in the air line 29 to leak away. Valve 42 thus sets the maximum acceptable pressure in the enclosure 1.

Shown connected in the line 29 is a pressure test point 46 at which an indicator may be connected to provide a visual indication that the correct operating pressure is present in this line and hence that valves 41, 42 are all closed.

The line 29 is connected also the inlet 50 of a latch valve 51 which is one of the components of the purge/power selector module 3. The latch valve is of a well known type. It has two outlets 53 and 54, one or other which is communicated with the inlet 50 according to the valve position, that outlet not communicated to the inlet being connected instead to ambient atmosphere through one of the ports 55. The latch valve has a sliding valve member acted on by a spring so that the inlet 50 is normally connected to outlet 53, as depicted in FIG. 1. For displacing the valve member against the force of the spring, and hence to connect the inlet to the other outlet 54, a pneumatic actuator 56 is coupled to the valve member. The outlet 53 is connected to the above mentioned air way 38 which leads to the purge valve actuator 35. This air way includes a pressure test point 57 at which an indicator may be fitted for providing a visual indication of there being pressure in this air way.

The outlet port 54 is connected to the nozzle of a dump valve 60, and to a first inlet 66 of a shuttle valve 67. The dump valve has a diaphragm 61 normally held off the nozzle by a spring, the space on the side of the diaphragm opposite the nozzle being connected to the outlet 68 of the shuttle valve 67 which is also connected to the inlet at the latch valve actuator 56. The space in the dump valve on the same side of the diaphragm as the nozzle and spring is connected to ambient atmosphere. The shuttle valve has a second inlet 69, which is connected to an air passage 70 leading from the timing module 4, and a valve shuttle member which is movable by the pressure of incoming air to connect either inlet 66,69 to the outlet 68 and to close the other inlet However, the pressure delivered to inlet 69 acts on a smaller area of the shuttle member than that delivered through inlet 66. Thus when a pneumatic air pressure signal arrives at inlet 69, it is transmitted to the outlet 68, there being no pressure at inlet 66 due to the dump valve being open. The pressure signal is applied to the dump valve 60 and closes it, and is also applied to the actuator 56 of the latch valve 51 so that this valve is changed over to connect its inlet 50 to outlet 54, with the result that air pressure in line 29 is delivered to the inlet 66 of the shuttle valve, whereby the shuttle member closes inlet 69, and this air pressure then serves to maintain the dump valve closed and the latch valve in its actuated condition. Included in the purge power selector module are two electric switches 72 with respective pneumatic pressure actuators 73 each connected to the outlet port 54 of the latch valve, whereby when the latch valve is actuated as described above the air flow causes the electrical switches 72 to be closed for turning on electrical power to the equipment housed in the enclosure 1 via an electrical switching box 74. To indicate whether the switches are actuated a visual indicator 76 is connected to the switch actuators.

It will be seen that the nozzle of the second low pressure sensing diaphragm valve 41b has its nozzle connected to the line interconnecting the outlet 54 of the latch valve 51 and the inlet 66 of the shuttle valve. Thus, valve 41b provided added security against the electric switches 72 being operated by the actuators 73 if the pressure in the enclosure 1 is below the predetermined minimum operating pressure.

Turning now to the timing module, it incorporates two parallel connected pressure differential sensing valves 80. Each valve has a nozzle connected to an air duct 75 communicated with the control air line 32 leading from the exit port of the purge valve, through a fixed flow restrictor 81. A diaphragm is urged away from the nozzle by a spring. The space on the side of the diaphragm remote from the spring and nozzle is connected to the interior of the enclosure 1, whereas the space on the opposite side of the diaphragm is connected to the pressure sensing port 17 in the seat 10 of the exit valve. Hence valves 80 remain open until the pressure differential across the radial orifice defined by the seat 10 and the baffle 13 is sufficient to overcome the force of the springs of these valves 80.

Two pneumatic trigger valves 83 are provided and each comprises two compartments separated by a diaphragm. The first compartment has a port connected to the air duct 75, while the second compartment has an inlet connected to an air passageway 85 and an outlet communicating with atmosphere. The spring urges the diaphragm away from the inlet, and the diaphragm is arranged to close rapidly the inlet in response to a pressure build up in the first compartment. Consequently, when the pressure differential sensor valves 80 close, there follows a build up of air pressure in the duct 75 and hence the first compartments of the trigger valves 83 so that the latter are quickly closed enabling pressure to build up in the passageway 85. The passageway 85 is connected to the control line 32 through a variable restrictor 86 which determines the rate of pressure increase in the passageway 85 when the trigger valves 83 are closed. A closed timing chamber 88 is connected by a pipe 89 to the passageway 85 and defines a volume to ensure a gradual pressure rise, as represented by the graphical illustration of pressure plotted against time shown superimposed on the chamber 88 in FIG. 1. A pressure gauge 90 can be connected to the timing chamber 88 to indicate the pressure within it. The passageway 85 is coupled to the air passage 70 through two series connected triggering valves 91, 92 which are arranged to open when the pressure in passageway 85, and therefore in chamber 88, reaches a predetermined level which is set by means of adjustment screws 93 of the triggering valves 91, 92.

Each valve 91, 92 has an inlet and an outlet normally isolated from each other by a diaphragm biased to seal around the inlet by a spring, the compression of which is adjusted with the screw 93. A chamber formed on the side of the diaphragm opposite the inlet and outlet is connected to atmosphere and to the outlet through a fixed restrictor 94. When the pressure at the inlet rises, it eventually reaches a level at which the force of the spring is overcome and air leaks past the diaphragm seal to the outlet, the pressure then acting over the full area of the diaphragm to produce a rapid opening operation. When the valve is opened in this manner, the diaphragm is displaced to effect a seal interrupting the connection between the port open to atmosphere and that connected to the outlet so that the pressure transmitted to the outlet is not lost to atmosphere.

The outlet of the valve 91 is connected to the inlet of valve 92, so that both valves must be opened before a pressure signal reaches the air passage 70. In practice both valves 91, 92 will be adjusted to open at about the same triggering pressure. The air passage 70 is connected to atmosphere through a fixed flow restrictor 96, the connections to atmosphere through the restrictors 94, 96 being provided to avoid residual pressure due to gas being tapped within the pneumatic system. The air passage 70 includes a pressure test point to which a visual indicator 97 can be connected to show when the triggering valves 91, 92 are opened. A further test point for a visual indicator 98 which will signal opening of the purge valve can be connected to the control line 32.

To operate the apparatus all that is required is to connect the air inlet 26 to a source of compressed air. The purge valve will initially be closed, due to the action of spring 25. Air passes into the enclosure at a relatively low flow rate set by the regulator 27. Because the exit valve 10,11 is closed due to its spring 12, the pressure in the enclosure will start to increase. From the purge valve air also passes to the air line 29, but because the low pressure sensor valve 41a is open there is no build up of pressure downstream of restrictor 40 sufficient to activate the purge valve actuator 35. The pressure in the enclosure soon reaches a level sufficient to close the valve 41a. If it does not, nothing further will happen, the lack of control pressure being signalled at test point 46 to indicate an irregularity, for example the inspection door of the enclosure is open. When valve 41a closes the pressure in line 29 increases and is communicated via the latch valve 51 to the purge valve actuator 35 which responds by displacing the valve spool to open the purge valve. Air then flows into the enclosure at a substantially increased rate set by the purge flow regulator 30, and air is also delivered to control line 32 and hence to air duct 75 and air passageway 85. The increased air flow into the enclosure raises the pressure higher, and the exit valve opens to limit the pressure by allowing the air to escape. When the desired flow rate of gas through the enclosure for purging is reached, a given pressure differential appears across the radial orifice of the exit module, and as previously described this pressure differential is sensed by the sensor valves 80 which respond by operating the trigger valves 83. Should the purging flow not be sufficient the trigger valves 83 will not be operated and the control sequence will not progress beyond this stage. When the trigger valves 83 close, air entering the air passageway 85 is delivered into the timing chamber 88 and the pressure in this chamber increases at a rate dependent upon the adjustment of the variable restrictor 86. After a time which is set for sufficient purging gas to have been passed through the enclosure, the pressure level reaches the triggering point at which the valves 91, 92 open and a pressure signal is delivered via the air passage 70 to the inlet 69 of the shuttle valve 67 of the purge power selector module In accordance with the operation described hereinabove, this results in operation of the latch valve 51 so that the electrical switches 72 are automatically actuated to turn on the electrical power, and at the same time the supply of air to the purge valve actuator 35 is cut off by the latch valve 51 with the consequence that the spring 25 closes the purge valve to cut off the purge flow of air into the enclosure. Of course, the reduced flow of air, i.e. the leakage compensation flow, into the enclosure through the regulator 27 continues so as to maintain the interior of the enclosure at slight positive pressure in relation to ambient atmosphere. The protected equipment energised by the activation of the switches 72 will continue to operate in accordance with its intended function until the supply of compressed air to the inlet 26 is interrupted. The resultant loss of pressure in the line 29 means that the dump valve 60 will be opened, the latch valve 51 will revert to the initial condition (as illustrated) and the electric switches 72 will open to disconnect the electric power supply.

For safety reasons only, the low pressure sensor valves 41, the pressure differential sensor valves 80, the trigger valves 83, the triggering valves 91, 92 and the electric switches and actuators 72, 73 are all duplicated. The system would still function exactly as described if only one each of these components were provided However, by including two it is ensured that two faults must occur before the control apparatus can malfunction with any risk to safety. It may be noted in this respect that only one high pressure sensor valve 42 is considered necessary since it itself only operates in the event of a fault, e.g. the exit valve failing to open.

Figure 3:
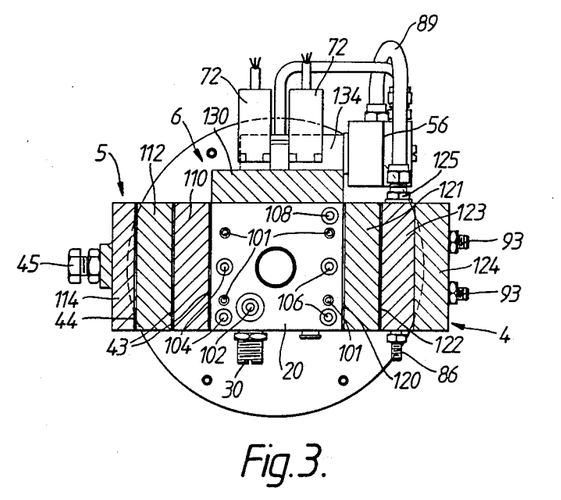
FIG. 3 is front end view of the control assembly of FIG. 2.
Figure 4:
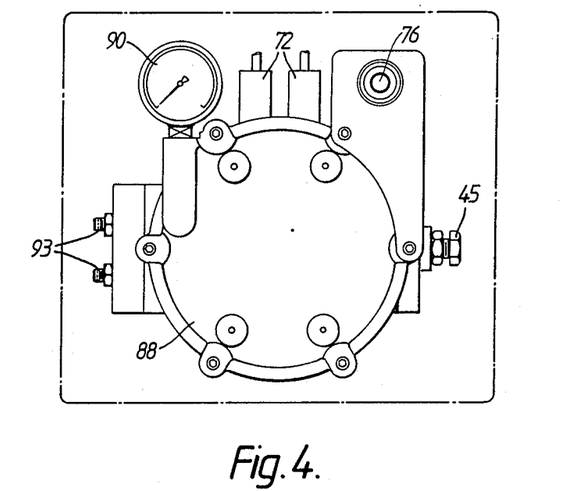
FIG. 4 is a rear end view of the control assembly of FIG. 2.
Figure 5:
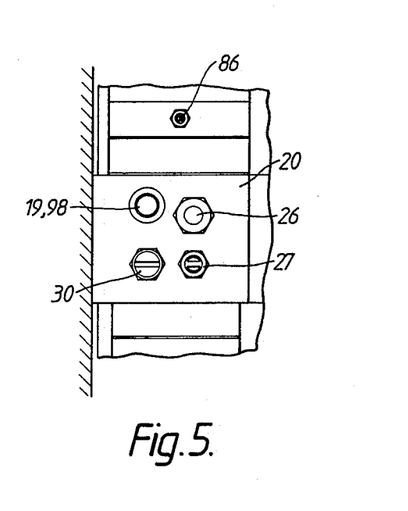
FIG. 5 is an underneath view showing part of the control assembly of FIG. 2.

The construction of the control assembly of the pressurising and purging apparatus is shown in FIGS. 2-5. It has its own casing 100, and is supported on the exterior of the enclosure 1 by means of bolts which are inserted into tapped holes 101 formed in the front face of the purge valve body 20. This body also serves as a manifold block providing all necessary connections with the interior of the enclosure. Thus, as seen in FIG. 3, the body has at its front face six ports arranged to register with corresponding orifices in the enclosure wall. One of these ports 102 is for the gas which flows from the chambers 23, 24 of the purge valve via the adjustable regulators 27, 30 respectively which are positioned in the underside of the body 1 and adjustable by rotating their screws which project therefrom. The components of the purge supply module are all embodied within the body 20 which is of rectangular configuration and provides flat mounting faces for the other modules which are supported on this body. Two ports 104 in the front face of body 20 connect the high and low pressure sensing valves of the enclosure pressure module, which is mounted on one side face of the body 20, to the inside of the enclosure. On the other side of the body is mounted the timing module (with exception of the timing chamber) and two further ports 106 connect the interior of the enclosure to the respective pressure differential sensor valves 80 of this module. The remaining port 108 is provided for connecting the pressure sensing port 17 of the exit valve unit to each of the pressure differential sensing valves 80. On the top face of the body 1 is mounted the purge/power selection module 6, and mounted upon its rear face is a sub-assembly which incorporates the purge valve actuator 35, the timing chamber 88, the pressure gauge 90, and the pressure indicator 76.

The enclosure pressure module is assembled from a number of parts stacked and bolted together onto the body 20. The parts seen in order away from the body 20 are a first low pressure valve diaphragm 43, a first housing block 110, a second low pressure valve diaphragm 43, a second housing block 112, a high pressure valve diaphragm 44, and a third housing block 114. The first housing block includes a nozzle for cooperation with the first diaphragm 43 and also accommodates the spring which acts on this diaphragm; the second housing block 112 includes one nozzle which cooperates with the second diaphragm 43 and another nozzle which cooperates with diaphragm 44, and accommodates the spring which acts on the second diaphragm 43; and the third housing block 114 accommodates the spring which acts on diaphragm 44 and carries the adjustment screw 45 for the high pressure sensor valve 42. The necessary air flow connections of the pressure sensor valves to the ports 104, to the purge/power selector module and to the chamber 23 of the purge valve are provided by conduits formed within the body 20 and the three housing blocks 110, 112, 114, with apertures being provided in the intervening diaphragms 43, 44 as required.

The timing module is similarly assembled as a stack of members bolted together and onto the body 20. The members, in the direction away from the body 20 are, a first diaphragm 120, a first housing block 121, a second diaphragm 122, a second housing block 123 and a third housing block 124. The diaphragms 120, 122 are those of the respective pressure differential sensor valves 80, the nozzles of these valves being formed within the first housing block 121 for cooperation with the respective diaphragms and the valve springs also being accommodated in this block 121. Within the second housing block 123 are provided the air passageway 85, and the variable restrictor 86 which is adjustable by means of a screw protruding from the block 123 to vary the air flow rate into this passageway 85. The block includes a pipe coupling 125 for connection of the pipe 89 which connects passageway 85 to the timing chamber 88. The third and outermost block 124 houses the trigger vales 83 and the triggering valves 91, 92 with the adjustment screws 93 of the latter protruding through the end face of the block. The valves 83, 91, 92 are located in respective cavities in block 124 with their diaphragms essentially coplanar and centred at the corners of the a square. The springs of the respective valves are of course accommodated in the corresponding cavities.

The various air flow connections between the valves within the timing module and with the associated ports of the body 20 are all formed by conduits within the walls the body 20 and the housing blocks 121, 123, 124, the diaphragms 120, 122 being suitably apertured where conduits cross them As mentioned previously, the purge/power selector module is mounted on the top face of the body 20. This module includes a first valve block 130 bolted to the body, the two electric switches 72 supported above this block, and a latch valve subassembly carried on the block. The block 130 houses the switch actuators, 73, the diaphragms of which can be held between block 130 and body 20. The diaphragms displace respective pins coaxial with the diaphragms and protruding through the top of the block 130 for operating the switches 72. Also housed in the block 130 are the shuttle valve 67 and the dump valve 60, these valves being conveniently positioned side-by-side and to the rear of the switch actuators. The latch valve sub-assembly includes a housing block 134 firmly fixed on the top of block 130 and to the rear of which is attached the latch valve actuator 56 with its diaphragm clamped between two housing parts. The latch valve has a total of five inlet and outlet ports, as apparent from FIG. 1, and these are located on the lower face of the block 134 for registration with corresponding ports at the upper face of block 130. The air flow connections of the purge/power module with the enclosure pressure module, the timing module and the purge valve are provided by conduits formed in and extending through the body 20.

From the foregoing description it will be understood that the control assembly forms an integrated unit with the number of pipe connections reduced to just two, namely that between the timing chamber and the timing module, and another between the latch valve actuator 56 and the block 130 which houses the shuttle valve 67 and the dump valve 60. (One additional pipe will be used to connect the port 108 to the exit valve seat). The advantages secured are good reliability as well as a neat and compact construction. Servicing problems often associated with pneumatic equipment having large numbers of pipe connections are also precluded. These benefits are in no small way due to the purge valve body serving additionally as a manifold providing the necessary connections between the modules which are combined in the control assembly as well as from these modules to the enclosure 1.

I claim:

1. An apparatus for pressurising and purging with gas the interior of an enclosure, comprising purge valve means for controlling communication between a source of pressurised gas and the enclosure interior for gas to enter the enclosure either at a relatively high flow rate for purging or at a substantially reduced flow rate for maintaining a positive pressure in the enclosure, and pneumatically operable control means for operating the purge control valve, whereby gas initially enters the enclosure at said reduced flow rate, upon the enclosure pressure reaching a given pressure level the purge valve means is opened for gas to enter the enclosure at said high flow rate, and the purge valve means is closed so that gas enters the enclosure at the reduced flow rate again after the purging gas flow has been established for a certain time, wherein the purge valve means comprises a valve body adapted to be mounted directly on a wall the enclosure with port means provided in a face of the valve body registering with orifice means in said wall for communicating the pressurising and purging apparatus directly with the enclosure interior, and the valve body carries the pneumatic control means and constitutes a manifold providing communication between different parts of the control means and communication thereof with the chamber enclosure.

2. An apparatus according to claim 1, wherein said face of the valve body includes at least one port for delivering gas into the enclosure, and at least one port for sensing the gas pressure in the enclosure.

3. An apparatus according to claim 2, wherein said face of the valve body further includes a port for connecting the control apparatus to an exit module for sensing the flow rate of gas leaving the enclosure via the exit module.

4. An apparatus according to claim 2, wherein the control means includes purge selector means for controlling opening and closing of the purge valve means, enclosure pressure monitoring means for disabling the purge selector means so that the purge valve cannot be opened when the enclosure pressure is outside a given pressure range, and timing means for providing a signal to the purge selector means to close the purge valve means after said certain time of purging gas flow, each of the timing means and said enclosure pressure monitoring means being in communication with the enclosure interior via a pressure sensing port in said end face of the valve body.

5. An apparatus according to claim 4, wherein the purge selector means, the enclosure pressure monitoring means and the timing means are mounted on respective faces of the purge valve body, and the timing means and the pressure monitoring means have ports connected to respective ports of the purge selector means through the valve body.

6. An apparatus according to claim 5, wherein the purge valve body is of substantially rectangular configuration, a front end face of the body being adapted to be fastened to the enclosure wall and the purge selector means, the enclosure pressure monitoring means and the timing means being mounted on respective side faces of the valve body.

7. An apparatus according to claim 6, wherein a pneumatic actuator for operating the purge valve means is carried on the end of the body opposite said front end face, the actuator having a pressure chamber with a gas port connected to an outlet port of the purge selector module by an air way extending through the purge valve body.

8. An apparatus according to claim 6, wherein the purge valve means includes adjustment means for adjusting the gas flow rates at said high flow rate and/or at said reduced flow rate, said adjustment means being located on the side of the valve body not mounting the purge selector means, the enclosure pressure monitoring means or the timing means.

9. An apparatus according to claim 4, wherein a timing chamber is carried on the purge valve body and is coupled to the timing means by a connection pipe, said connection pipe being the only connection pipe connected to the timing means.

10. An apparatus according to claim 4, wherein the enclosure pressure monitoring means includes high and low pressure diaphragm valves and is assembled as a stack of alternate housing blocks and diaphragms fastened to the purge valve body.

11. An apparatus according to claim 10, wherein the high pressure diaphragm valve includes means for adjusting the operating pressure thereof thereby to vary the upper limit of said pressure range, said adjustment means being mounted on the housing block most remote from the purge valve body.

12. An apparatus according to claim 4, wherein the timing means is assembled from a stack of alternate housing blocks and diaphragms fastened to the purge valve body and forming at least one pressure differential sensor valve, at least one trigger valve and at least one triggering valve, the sensor valve providing a signal to the trigger valve when a predetermined gas flow rate through the enclosure is established for said trigger valve to initiate a timing operation by causing pressure to increase gradually in a timing chamber, and the triggering valve delivering an output pressure signal when a given pressure level is reached in said chamber.

13. An apparatus according to claim 12, wherein the timing means includes means for adjusting the rate of gas flow into the timing chamber thereby to adjust the interval between the timing operation being initiated and the triggering valve delivering the output signal, said adjustment means being located on an intermediate housing block of the timing means.

14. An apparatus according to claim 12 wherein adjusting means are provided for adjusting the pressure at which said triggering valve operates to deliver the output-signal, said adjusting means being located on the housing block of the timing means most remote from the purge valve body.

15. An apparatus according to claim 4, wherein the purge selector means comprises a first block fastened to the purge valve body and mounting a latch valve sub-assembly, the latch valve controlling communication of a gas supply line with an air way communicating with an actuator of the purge valve means, said first block incorporating a shuttle valve and a dump valve for operating the latch valve to interrupt said communication when a signal is provided by the timing means, said latch valve having several ports all provided in the face of a latch valve housing block engaged with the first block.

16. An apparatus according to claim 1 wherein the control means includes a pneumatic actuator for closing an electric switch and arranged to to be actuated upon said purge valve means being closed after purging the enclosure interior.

17. An apparatus according to claim 15, wherein said first block includes an actuator for operating an electric switch mounted on said first block, the actuator having a pressure space communicating with a port of said latch valve brought into communication with the air supply line upon said latch valve being operated in response to a signal from the timing means.

18. An apparatus according to claim 16 or 17, wherein the control means is so arranged that the actuator will be operated to close the electric switch only after the enclosure interior has been correctly pressurised and purged with gas by opening and closing of the purge valve under control of the control means, even in the event of any single component failure of the control means.

19. An apparatus for pressurising and purging with gas the interior of an enclosure comprising:

a purge valve having a body, a valve member movable between open and closed positions in the body, the body having a front face for mounting against a wall of the enclosure, an inlet for connection to a source of pressurised gas, an outlet port connected constantly to the inlet, outlet means in said front face for delivering gas at a relatively high flow rate into the enclosure interior when the valve member is in the open position and at a substantially lower rate when the valve member is in the closed position and a control outlet port for providing gas under pressure when the valve member is in the open position, and gas pressure operable actuator means for moving the valve member;

a purge selector module mounted on the valve body and comprising an inlet registering with said outlet port of the valve body for connection of the inlet to the pressurised gas source, an outlet connected to the actuator means of the purge valve, latch valve means for connecting said outlet to said inlet for gas to be conducted to the actuator means for opening the purge valve, a control inlet, and control means connected to the control inlet for operating the latch valve to interrupt communication between the inlet and outlet in response to a pressure signal received at the control inlet;

an exit module including sensor means for sensing the gas flow rate through an exit orifice for conducting gas from the enclosure interior and producing a differential pressure signal;

a timing module mounted on the purge valve body having first port means for receiving said differential pressure signal, an inlet port registering with said control outlet port of the purge valve body, and a pressure signal outlet port connected to the control inlet of the purge selector module through a conduit provided in the purge valve body, the timing means being arranged to emit a pressure signal at said pressure signal outlet port a predetermined time after the purge valve has been opened and a predetermined gas flow rate has been reached through said exit orifice; and an enclosure pressure module mounted on the purge valve body and having at least one inlet connected to the enclosure interior through a conduit provided in the valve body and opening at a port in said front face of the purge valve body, port means connected to the purge selector module through conduit means provided in the purge valve body, and high and low pressure sensor valve means connected between said inlet means and said port means for preventing supply of gas under pressure to the purge valve actuator means when the pressure in the enclosure is outside a predetermined range.

20. An apparatus according to claim 19, wherein the latch valve means includes a second outlet which is connected to said inlet upon the latch valve being operated to interrupt communication between the inlet and the first outlet, an actuator for operating an electric switch is connected to said second outlet, and the purge selector module, the timing module and the enclosure pressure module are so constructed and arranged that said actuator will be actuated to operate the electric switch only after the enclosure interior has been correctly pressurised and purged by opening and closing of the purge valve, even in the event of a single pneumatic component failure of the apparatus.

21. An apparatus according to claim 16, 17 or 20 wherein a pair of actuators are connected in parallel for operating respective electric switches which are connected electrically in series.

* * * * *